US006583728B1

(12) United States Patent
Staerzl

(10) Patent No.: US 6,583,728 B1
(45) Date of Patent: Jun. 24, 2003

(54) TRIM TAB POSITION MONITOR

(75) Inventor: Richard E. Staerzl, Fond du Lac, WI (US)

(73) Assignee: Brunswick Corporation, Lake Forest, IL (US)

( * ) Notice: Subject to any disclaimer, the term of this patent is extended or adjusted under 35 U.S.C. 154(b) by 89 days.

(21) Appl. No.: 09/976,975

(22) Filed: Oct. 12, 2001

(51) Int. Cl.[7] ................................................ G08B 21/00
(52) U.S. Cl. ................... 340/686.1; 340/686.3; 114/144 R; 114/285; 114/286
(58) Field of Search ..................... 340/686.1, 686.3; 114/144 R, 285, 286

(56) References Cited

U.S. PATENT DOCUMENTS

| 4,420,741 A | 12/1983 | West | 340/29 |
|---|---|---|---|
| 4,644,893 A | 2/1987 | Zepp | 114/286 |
| 4,742,794 A | 5/1988 | Hagstrom | 114/286 |
| 4,854,259 A | 8/1989 | Cluett | 114/285 |
| 5,385,110 A | 1/1995 | Bennett et al. | 114/285 |
| 5,474,013 A | 12/1995 | Wittmaier | 114/286 |
| 6,273,771 B1 | 8/2001 | Buckley et al. | 440/84 |
| 6,280,269 B1 | 8/2001 | Gaynor | 440/84 |

*Primary Examiner*—Julie Lieu
(74) *Attorney, Agent, or Firm*—William D. Lanyi

(57) ABSTRACT

A trim tab monitoring circuit is provided which receives a signal that is representative of a voltage potential across a stator winding of a motor which is attached to the trim tab. This signal is passed through a high pass filter to remove the DC component of the signal, amplified, and passed through a low pass filter to remove certain high frequencies components of the signal. A zero crossing detector is used to discern individual pulses which are then received by a counter that provides a single output pulse for a predetermined number of input pulses. The series of output pulses from the counter are conditioned and, in conjunction with a direction sensor, provided to an up/down counter controller that provides digital signals to a signal output circuit. The signal output circuit provides a DC voltage output to a display and the DC output voltage is representative of the position of the trim tab.

20 Claims, 5 Drawing Sheets

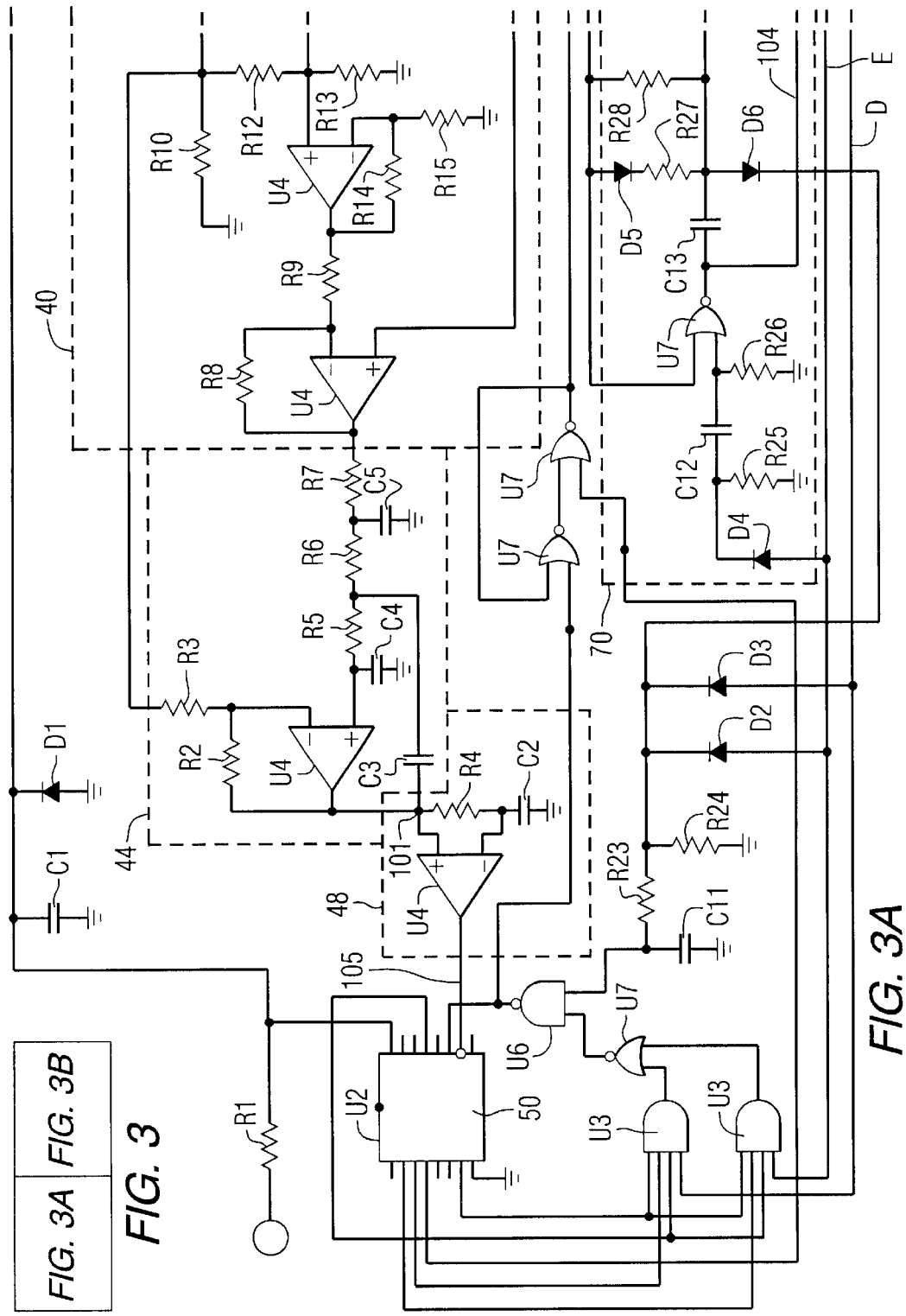

TRIM TAB POSITION MONITOR

BACKGROUND OF THE INVENTION

1. Field of the Invention

The present invention is generally related to a trim tab position monitor and, more particularly, to a monitoring circuit which determines the position of a trim tab of a marine vessel by determining the number of changes in magnitude of an electrical characteristic of a motor which is attached to the trim tab.

2. Description of the Prior Art

Many different ways are known for measuring the angular position of a trim tab relative to a transom of a marine vessel.

U.S. Pat. No. 4,420,741, which issued to West on Dec. 13, 1983, describes a trim tab position monitor and display device. An electric position monitor and read out device for trim tabs on boats is described in which the monitor and read out device are connected to the trim tab controls. The device is electronic and position display is based on the time required for trim tab movement. Signals from the trim tab controls produce signals from timers which in turn are directed to enabling circuits. If the enabling circuits pass the timer signals, they are counted in counter circuits and hence directed to a decoder and finally to the display panel. The display panel is arranged to show the precise angular position of the trim tabs to the boat operator.

U.S. Pat. No. 4,644,893, which issued to Zepp on Feb. 24, 1987, describes a position indicating apparatus for use in a boat leveling system. The boat leveling system has a pair of trim tabs which are pivotal between a horizontal position and a downward inclined position. Each trim tab is actuatable between the horizontal and inclined positions by a separate fluid motor which includes a cylinder, a piston slidably disposed in the cylinder and a rod connected to the piston. The position of each trim tab is indicated by apparatus which includes a linear potentiometer attached to the rod of the associated fluid motor, the potentiometer having a flexible plastic envelope and a pair of normally spaced apart conductive strips sealed in the envelope, a ball and spring carried by the cylinder for contacting the envelope and forcing the strips into electrical contact with each other, and a resistance measuring device connected in circuit with the potentiometer and to provide a readout in degrees of the downward angle from the horizontal of the trim tab.

U.S. Pat. No. 4,854,259, which issued to Cluett on Aug. 8, 1989, describes an improved trim tab control system for power boats. The trim tab control for boats has for each trim tab a yoke movably secured to a frame, a mechanical link between the yoke and the trim tab such that yoke and trim tab move in unison, a lever pivotably mounted with respect to the yoke and having first and second engagement surfaces, and a pair of switches on the yoke positioned for selective engagement with the lever surfaces to actuate a hydraulic device for moving the trim tab in opposite directions. Tab adjustment is carried out by continuing movement of the lever with respect to the yoke, which the yoke moves in response to such adjustment. A scale is secured adjacent to the lever such that the lever position provides visual indication of the trim tab position.

U.S. Pat. No. 5,385,110, which issued to Bennett et al on Jan. 31, 1995, describes a boat trim control and monitor system. A boat trim control system that includes a boat having a hull and means such as trim tabs mounted on the hull for trimming attitude of the boat as the hull is propelled through the water. The system includes facility for selectively adjusting the trim tabs to maintain a desired boat attitude under varying load and sea conditions. A sensor is mounted on the boat hull to provide an electrical sensor signal as a function of boat attitude, and is connected to electronic control circuitry responsive to the sensor signal for determining attitude of the boat hull. This electronic control circuitry further includes facility for operator setting of a desired boat attitude. The electronic control circuitry is coupled to an operator display for indicating departure of actual boat attitude indicated by the sensor from the boat attitude desired by the operator, and/or to automatic control circuitry for automatically varying trim tab orientation with respect to the boat hull so as to maintain the boat attitude desired by the operator.

U.S. Pat. No. 5,474,013, which issued to Wittmaier on Dec. 12, 1995, describes a trim tab auto-retract and multiple switching device. Electromechanical control circuit for causing trim tabs attached to the stern of a hull of a motorized marine vessel, and used to trim the attitude of the vessel, to be automatically fully retracted by activating means independently of the boat ignition switch to cause a capacitor in the circuit to discharge is described. The means can include at least one switch connected between the capacitor and the electrical power source to which the control circuit can be connected such that the means are activated when the switch is opened. The switch can be positioned at multiple locations throughout the boat or, alternatively, controls to cause the switch to open can be mounted to the boat at multiple locations throughout the craft, including at the main control panel. The means can also be in communication with the boat engine gear shift controls such that the means are activated when the vessel engine is shifted into reverse gear. The control circuit further includes means for preventing damage to the circuit components if the circuit is improperly connected to the electrical power source.

U.S. Pat. No. 6,273,771, which issued to Buckley et al on Aug. 14, 2001, discloses a control system for a marine vessel. A control system incorporates a marine propulsion system that can be attached to a marine vessel and connected in signal communication with a serial communication bus and a controller. A plurality of input devices and output devices are also connected in signal communication with the communication bus and a bus access manager, such as a CAN Kingdom network, is connected in signal communication with the controller to regulate the incorporation of additional devices to the plurality of devices in signal communication with the bus whereby the controller is connected in signal communication with each of the plurality of devices on the communication bus. The input and output devices can each transmit messages to the serial communication for receipt by other devices.

U.S. Pat. No. 4,742,794, which issued to Hagstrom on May 10, 1988, describes a trim tab indicator system. The indicator system comprises a pair of trim members hinged to the stern of a boat, one on each side of the center line of the boat and a hydraulic cylinder attached to each trim member having a first head at one end and a second head at the other end. The cylinder includes a piston and a tubular shaft connected to the piston and extending through the first end of the cylinder. A bracket is connected to the first head and has a surface complementary to the transom of the boat and is mounted on the transom. A tubular coil is fixed on the first head and extends axially within the cylinder, and a floating rod of magnetically permeable material is provided in the tubular shaft with a lower end engaging the base of the tubular opening of the shaft with its upper end extending into the coil such that movement of the trim tab changes the inductive relationship between the rod and the coil to provide a signal representing the position of the tab.

U.S. Pat. No. 6,280,269, which issued to Gaynor on Aug. 28, 2001, discloses an operator display panel control by throttle mechanism switch manipulation. A throttle control mechanism is provided with a plurality of buttons and a control unit that interprets the state of the various buttons and switches in different ways, depending on the state of a first operating parameter. The first operating parameter can be the gear selector position or the status of a manual selector switch or push button. Based on the state of the first operating parameter, at least one switch is interpreted to represent a first command based on a first state of the first operating parameter and a second command based on the second state of the first operating parameter. This allows dual functionality for the buttons and switches which reduces the required number of switches and also allows the important control switches to be placed easily within reach of the operator of a marine vessel.

The patents described above are hereby expressly incorporated by reference in the description of the present invention.

Known trim tab position monitoring devices typically incorporate sensors, such as Hall effect devices or potentiometers, which are physically attached to the trim tabs or the pressure cylinders used to move the trim tabs. It is also known that motors can be used to move actuating rods that, in turn, are attached to the trim tabs to move the trim tabs in response to movement of the motor. When position sensing devices are located at or near the trim tabs themselves, those devices are subjected to the corrosive and potential damaging effects of submersion in water. These effects can be particularly deleterious when a marine vessel is operated in salt water. It would therefore be significantly advantageous if a means could be provided for determining the position of the trim tabs relative to the transom of a boat without having to physically measure the angular position of the trim tab at the location proximate the trim tab. It would also be significantly beneficial if the trim tab position could be determined without the requirement of additional expensive measuring equipment or sensors.

SUMMARY OF THE INVENTION

The trim tab monitor made in accordance with the preferred embodiment of the present invention comprises a sensing circuit connected in signal communication with a stator of a motor. The motor has a rotor and a stator. The rotor is operatively connected to the trim tab for moving the trim tab relative to the marine vessel. The sensing circuit is configured to provide a first output signal which is representative of a preselected electrical characteristic of the motor. In a particularly preferred embodiment of the present invention, the first output signal represents an electrical characteristic relating the voltage potential across the stator of the motor which exhibits fluctuations as a result of the movement of rotor poles past the various portions of the stator winding. These fluctuations are caused by the reverse electromotive force (emf) experienced by the stator winding. The present invention further comprises a direction determining circuit that is connected in electrical communication with the sensing circuit. The direction determining circuit is configured to provide a second signal which is representative of the rotational direction (i.e. clockwise or counterclockwise) of the rotor relative to the stator of the motor. The present invention further comprises a counter connected in electrical communication with a sensing circuit and configured to provide a third output signal which is representative of a preselected number of magnitude changes of the first output signal. This counter is typically a "divide by" counter which provides an output signal pulse at a rate which is some reduced factor of the rate of the pulses received by the counter. For example, a counter may be configured to provide a single output pulse for every 128 input pulses, or any other predetermined number of input pulses selected as a function of the type of application in which the present invention is used. The present invention further comprises a signal output device connected in electrical communication with the counter for providing a fourth output signal which is representative of the position of the trim tab relative to the motor.

It should be understood that the present invention actually provides an output signal that represents the physical condition of the point at which the trim tab is connected to a moveable actuator that is driven by the rotor of the motor. This output signal may represent a magnitude that has a nonlinear relationship to the physical angle of the trim tab relative to the transom of a marine vessel. As will be described in greater detail below, an output device or output monitor can be provided with a conversion table that easily converts the output received from the present invention to an angle representing the resulting angle between the trim tab and the transom of the boat or, alternatively, an angle between the trim tab and a horizontal plane.

The electrical characteristic of the motor can be a voltage potential across the stator of the motor which exhibits magnitude fluctuations that are caused by the rotation of the rotor relative to the stator. As described above, these fluctuations can be caused by the reverse electromotive force experienced by the stator when poles of the rotor pass certain portions of the stator. The sensing circuit can comprise a differential amplifier circuit connected in signal communication with the stator of the motor and can also comprise a low pass filter for separating an AC component of the electrical characteristic from a DC component of the electrical characteristic. The sensing circuit can also comprise a zero crossing detector which is configured to provide a fifth output signal. The zero crossing detector is connected in signal communication with the counter.

In a particularly preferred embodiment of the present invention, the signal output device is connected in signal communication with the counter and in signal communication with a boat position annunciator. The boat position annunciator can be a visual display for the operator of the marine vessel. In certain embodiments of the present invention, the rotor of the motor is operatively attached to a threaded shaft which rotates in response to rotation of the rotor. The threaded shaft can be operatively connected to the trim tab, whereby rotation of the rotor causes the threaded shaft to rotate and rotation of the threaded shaft causes the trim tab to move relative to the stator of the motor as it pivots about a pivot point attached to the transom of a marine vessel.

The signal output device can be a digital potentiometer which is configured to receive a digital signal which is representative of a change in the rotational position of the rotor relative to a preselected position, such as a preselected position that is associated with a horizontal position of the trim tab. The digital potentiometer provides a DC voltage signal which is representative of the stored digital count which, in turn, is representative of the cumulative change in the position of the rotor relative to the preselected position of the rotor relative to the stator. The direction determining circuit of the present invention can comprise a dual optocoupler. The present invention, in certain embodiments, can comprise a pulse conditioning circuit that is connected in signal communication between the counter and the signal output device in order to receive pulses from the counter and, prior to passing those pulses to the signal output device, the pulse conditioning circuit affects the timing and/or size of the pulses. In addition, the pulse conditioning circuit can be used to add pulses to the cumulative count as a function of whether or not the trim tab is being moved against the flow of water or with the flow of water.

Certain applications of the present invention provide a trim tab position monitor comprising a motor which has a stator and a rotor. The rotor is operatively connected to the trim tab to move the trim tab relative to the stator of the motor in response to rotation of the rotor of the motor relative to the stator. The sensing circuit is connected in electrical communication with the stator for sensing an electrical characteristic such as the voltage potential across the stator, of the motor. The sensing circuit comprises a signal conditioning circuit, a zero crossing detector, and a direction determining circuit. A counting circuit is configured to provide a series of digital pulses which are responsive to the signal conditioning circuit and to the zero crossing detector. A signal output circuit is connected in signal communication with the counting circuit and with the direction determining circuit and is configured to provide an analog output signal which is representative of a plurality of digital pulses and which is representative of the position of the trim tab relative to the stator. An output pulse conditioning circuit is connected between the counting circuit and the signal output circuit for controlling the timing and shape of the plurality of digital pulses. In a preferred embodiment, the motor is a DC motor and the signal conditioning circuit comprises a high pass filter, an amplifier, and a low pass filter. The direction determining circuit comprises a dual optocoupler and the signal output signal comprises a digital potentiometer. The stator of the motor, in a preferred embodiment of the present invention, is rotatably attached to a transom of a marine vessel and the rotor is attached to an actuator which is, in turn, attached to the trim tab.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Figure 1:
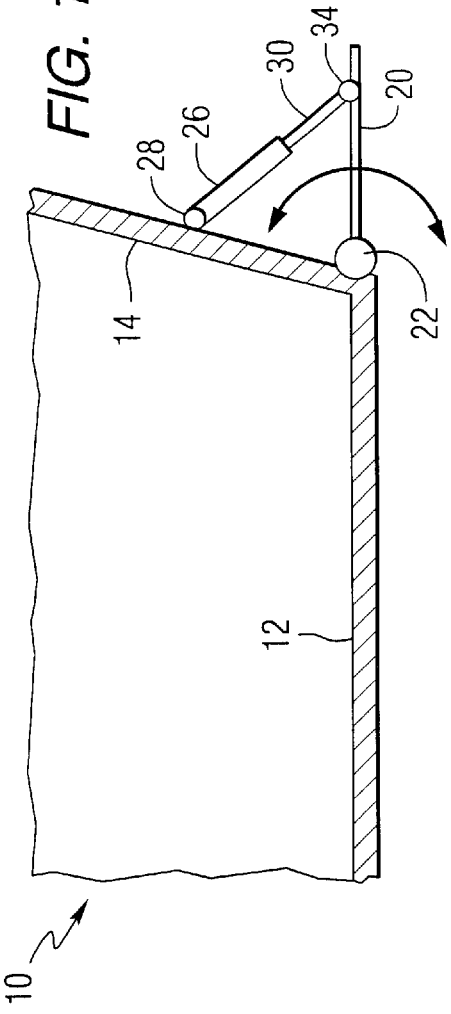
FIG. 1 is a simplified schematic showing the position of a trim tab relative to a transom of a marine vessel.

Throughout the description of the preferred embodiment of the present invention, like components will be identified by like reference numerals.

FIG. 1 is an exemplary illustration of a marine vessel 10 having a hull 12 and a transom 14. The marine vessel shown in FIG. 1 has a trim tab 20 which is rotatably attached to the transom 14 at a pivot point identified by reference numeral 22. A motor 26 has a stator and a rotor within a housing structure. The housing of the motor 26 is pivotally attached, at point 28, to the transom 14. An actuator 30 is associated with the rotor of the motor 26. The actuator 30 is connected to the trim tab 20, at point 34, so that extension of the actuator 30 away from the motor 26 causes the trim tab 20 to rotate about pivot point 22. In a particularly preferred embodiment of the present invention, the rotor of the motor 26 is associated with the actuator 30 in such a way that a threaded portion of the actuator 30 is caused to move into the motor 26 or out of the motor 26 as a function of the rotational direction of movement of the rotor relative to the stator of the motor 26. The use of trim tabs 20, in general, to maneuver and position a marine vessel 10 relative to the body of water in which it is operated will not be described in significant detail herein since those techniques are well known to those skilled in the art.

Figure 2:
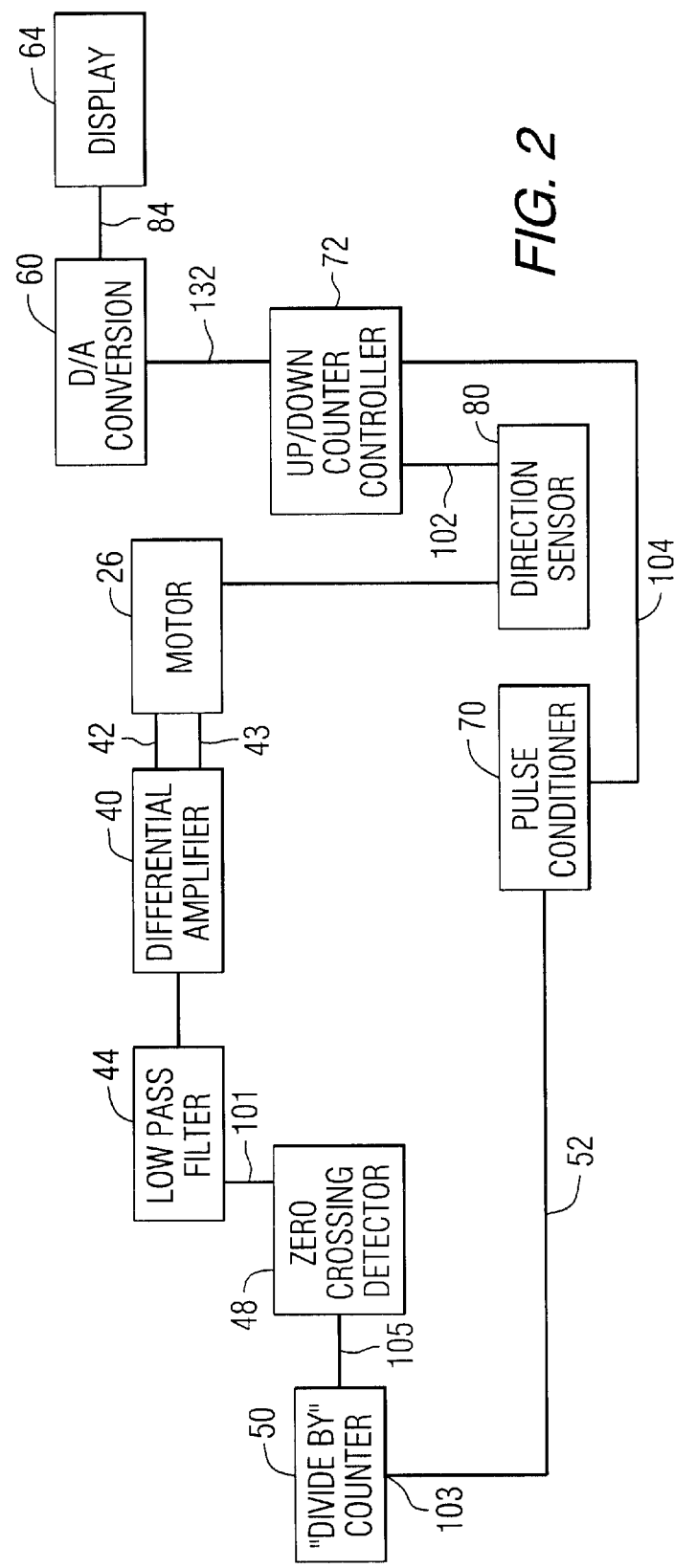
FIG. 2 is a highly simplified schematic representation of a circuit which implements the present invention.

FIG. 2 is a schematic and functional representation of an electrical circuit used to implement the present invention. In the schematic representation of FIG. 2, a differential amplifier 40 is connected to the motor 26, by lines 42 and 43, to measure the voltage potential across the stator winding of the motor 26. Although not specifically illustrated in FIG. 2, those skilled in the art are well aware of the basic structure of a DC motor 26 in which a stator is contained within the housing of the motor, comprising a stator winding, and a rotor is rotatably supported by the housing of the motor for rotation relative to the stator and about a centerline defined by the bearings of the motor 26. The differential amplifier 40 measures the voltage potential across the stator winding. The voltage potential across the stator of motor 26 will vary in magnitude with fluctuations which are caused by the passage of rotor poles relative to positions of the stator winding. The passage of the poles cause periodic reverse electromotive force (emf) which results in the pulsations, or fluctuations, in the voltage potential across the stator winding. As will be described in greater detail below, the differential amplifier circuit comprises a high pass filter which removes the DC component of the signal. The output of the differential amplifier 40 is then passed through a low pass filter 44 to remove high frequency components of the signal. It is then transmitted to a zero crossing detector 44 which allows the sensing circuit to delineate each of the individual pulses, or fluctuations, of the electrical characteristic of the motor. In FIG. 2, the functional blocks identified by reference numerals 40, 44, and 48 form the sensing circuit which receives the fluctuating signal from the stator of the motor 26 and provides that signal to a counter 50. Counter 50 is a "divide by" counter which collects a plurality of sequential pulses from the sensing circuit and provides a pulse on line 52 which represents a predefined number of pulses received by the counter 50 from the sensing circuit.

With continued reference to FIG. 2, a signal output device, such as the digital-to-analog (D/A) converter 60, is used to provide an output signal to a display or monitor device 64 for observation by the operator of the marine vessel. The signal output device 60 is connected in electrical communication with the counter 50 and, in a preferred embodiment of the present invention, several other subcircuits are connected between these two components. For example, a pulse conditioner circuit 70 receives the pulses from the counter 50, on line 52, and appropriately affects the timing, numbers, and duration of the pulses so that they are in better condition for use by up/down counter controller 72. A direction sensor 80, which comprises a dual optocoupler in a preferred embodiment of the present invention, receives signals from the motor 26 and provides those signals to the up/down counter controller 72. The counter controller 72, in response to signals received from the pulse conditioner 70 and the direction sensor 80, provides a series of pulses to the signal output device 60. In a preferred embodiment of the present invention, the signal output device 60 comprises a digital potentiometer which receives the digital pulses from the up/down counter controller 72 and stores a cumulative count which is the algebraic sum of the plurality of pulses. This algebraic sum is converted to an analog output that is received by the display 64.

Although not a required element in all applications of the present invention, it should be understood that the display 64 typically converts the signal received on line 84 after it is received. This conversion accounts for the associated geometry of the positions defined by the trim tab 20, the motor 26, and the transom 14 described above in conjunction with FIG. 1. It can be seen that the incremental movement of the actuator 30 into or out of the motor 26 represents a length that is not necessarily linear with respect to the affected angle of the trim tab 20 relative to the transom 14. This nonlinear relationship is affected by the distance between pivot point 22 and pivot point 28, the distance between pivot point 22 and pivot point 34, and the relative length of the motor 26 and its actuator 30 which define the length between pivot points 28 and 34. These absolute dimensions can vary, depending on the type of marine vessel 10 and trim tab 20 used in any particular application. However, it should be understood that the output on line 84 will have a minimum and maximum limit and a intermediate values which can be coordinated in a look up table to the precise angular relationship between the trim tab 20 and the transom 14 for any particular marine vessel application of the present invention.

Figure 3B:
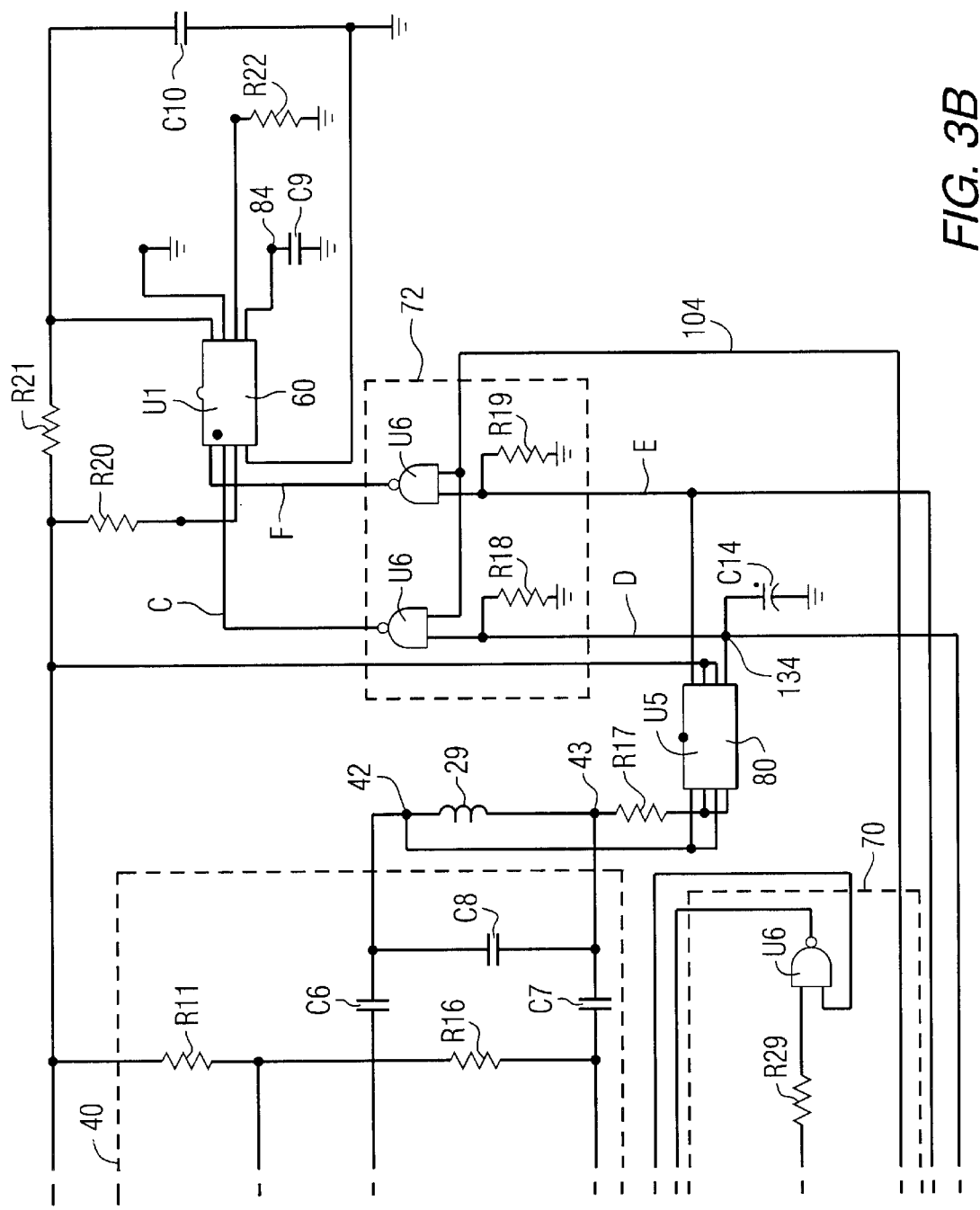
FIG. 3 is an electric circuit used to perform the functions of the present invention.

FIG. 3 is an electric circuit schematic showing a preferred embodiment of the present invention. The stator winding is identified by reference numeral 29 and connection points 42 and 43 represent the connection between the motor 26 and the differential amplifier subcircuit 40, as described above in conjunction with FIG. 2. The magnitudes and values of the components shown in FIG. 3 are identified in Table 1 below.

TABLE I

| REFERENCE | VALUE OR TYPE |
| --- | --- |
| R1 | 2 Ω |
| R2 | 100 kΩ |
| R3 | 100 kΩ |
| R4 | Ω |
| R5 | 16 kΩ |
| R6 | 16 kΩ |
| R7 | 1.6 kΩ |
| R8 | 51 kΩ |
| R9 | 10 kΩ |
| R10 | 1.3 kΩ |
| R11 | 2 kΩ |
| R12 | 10 kΩ |
| R13 | 51 kΩ |
| R14 | 10 kΩ |
| R15 | 51 kΩ |
| R16 | 10 kΩ |
| R17 | 1.3 kΩ |
| R18 | 100 kΩ |
| R19 | 100 kΩ |
| R20 | 1.3 kΩ |
| R21 | 100 Ω |
| R22 | 1.3 kΩ |
| R23 | 1 MΩ |
| R24 | 100 kΩ |
| R25 | 100 kΩ |

TABLE I-continued

| REFERENCE | VALUE OR TYPE |
| --- | --- |
| R26 | 1.6 MΩ |
| R27 | 360 KΩ |
| R28 | 750 KΩ |
| C1 | 0.1 µF |
| C2 | 0.1 µF |
| C3 | 0.1 µF |
| C4 | 0.1 µF |
| C5 | 0.1 µF |
| C6 | 0.1 µF |
| C7 | 0.1 µF |
| C8 | 0.1 µF |
| C9 | 0.1 µF |
| C10 | 0.1 µF |
| C11 | 0.1 µF |
| C12 | 0.1 µF |
| C13 | 0.1 µF |
| C14 | 2.2 µF |

Capacitors C6 and C7 function as a high pass filter to remove the DC voltage level from the signal received across points 42 and 43. Typically, the DC component of this signal is approximately 12 volts. After the operation of capacitors C6 and C7, only the AC component of the signal is amplified by the differential amplifiers, identified as U4 in dashed box 40 (i.e. differential amplifier circuit). The amplified signal of the fluctuations is provided by the differential amplifier subcircuit 40 to the low pass filter 44 which removes certain high frequency portions of the signal in order to make the signal more amenable for use by the zero crossing detector subcircuit 48 and the "divide by" counter 50. Depending on the input and output pins of the counter 50 which are used in the circuit of FIG. 3, different total number of pulses received from the zero crossing detector 48 will be required to generate a single output pulse from the divide by counter 50. The two 4-input AND devices (U3), in conjunction with the NOR device (U7) shown at the bottom left portion of FIG. 3, in conjunction with the counter 50, determine the required number of pulses necessary to be received by the counter from the zero crossing detector 48 in order to generate an output pulse received by the pulse conditioner circuit 70.

The pulse conditioner subcircuit 70 is essentially an astable, or free running, multivibrator which is configured to generate output pulses to the up/down counter controller 72 which have an appropriate duration. In addition, for reasons which will be described in greater detail below, the pulse conditioner subcircuit 70 is also configured to generate two 40 milliseconds pulses on motor startup in a preselected rotational direction.

With continued reference to FIG. 3, the two NOR components (U7) located directly above the left portion of the pulse conditioner subcircuit 70 and having a common input with the NAND device (U6) associated with counter 50, act as a flip-flop in the circuit of FIG. 3. The two-input NAND gate (U6) associated with the counter 50 serves to assure that the motor is running. In a preferred embodiment of the present invention, the counter 50 is configured, by the appropriate selection of its input and output pins, to divide the count on line 105 by 304, which is the sum of 128 plus 176.

The direction sensor 80, in a preferred embodiment of the present invention, is a dual optocoupler that is connected to the stator winding 29 and provides an output which is received by the up/down counter controller 72. As can be seen, the up/down counter controller 72 comprises two 2-input NAND devices (U6) which provide individual outputs to the signal output device 60. As described above, the signal output device 60 is a digital potentiometer in a preferred embodiment of the present invention. Connection point 84, which is connected to an output from the signal output device 60, is a connection point to which a display 64 or operator monitor can be connected. In other words, the analog signal from the signal output device 60 is provided at point 84 for connection to this type of device so that the display 64 can represent a visual depiction of either the position of the trim tabs or the relative position of the marine vessel.

In FIG. 3, and within the pulse conditioner subcircuit 70, capacitor C 12 and resistor R25 are used as a differentiator to the NOR device (U7) to which they are connected as an input. The effect of these components on the NOR device (U7) is to momentarily hold the signal at the input of the NOR device high in order to block additional pulses during the initial startup of the when it causes the actuator to further extend from the stator in order to move the trim tab against the force of the water moving under the marine vessel. Capacitor C 14, associated with the input to the up/down counter controller 72, allows a preselected number of pulses, after the motor is turned off, to pass to the input of the up/down counter controller 72 if the direction of the trim tab movement is aided by the force of water passing under the marine vessel. Line 104 in FIGS. 2 and 3 transmits the series of pulses originating at the counter 50 to the up/down counter controller 72.

As a result of the operation of the circuit shown in FIG. 3, the fluctuations in the voltage potential across the stator winding 29 of motor 26 are used to generate a DC output signal, at point 84, which can be used by a visual display 64 to illustrate the position or effect of the trim tab. In a preferred embodiment of the present invention, the count at the input of the signal output device 60 is a digital value ranging from zero to 31 and the output to the display 64, at point 84, varies from 0.5 volts to 4.5 volts. The DC value at point 84 represents the relative positions of pivot point 34 and pivot point 28 in FIG. 1. This value can then be adjusted to provide an angular position display showing either the angle between the trim tab and the transom 14 or, alternatively, the angle of the marine vessel 10 relative to a horizontal plane.

Figure 4:
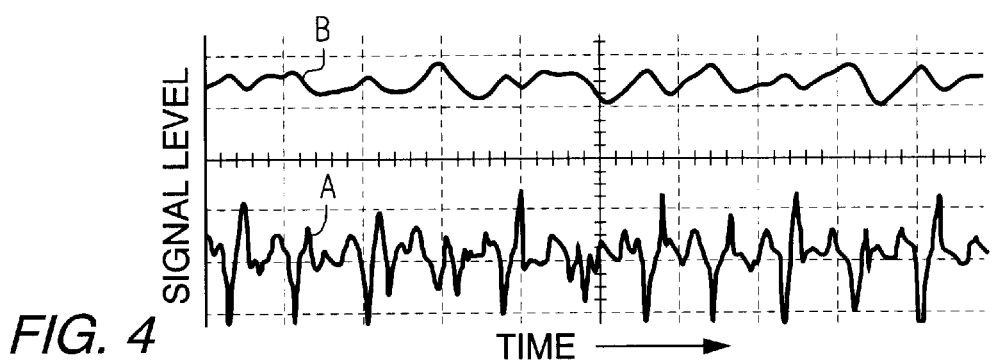
FIGS. 4–7 show various waveforms used to describe the operation of the present invention.

FIG. 4 compares time based representations of an output A from the differential amplifier 40 which could be seen, for example, at the circuit point between resistors R7 and R8 in FIG. 3. Signal A, shown in FIG. 4, is then passed through the low pass filter 44 to result in signal B which is the first output signal 101 that is provided as an input to the zero crossing detector 48.

Figure 5:
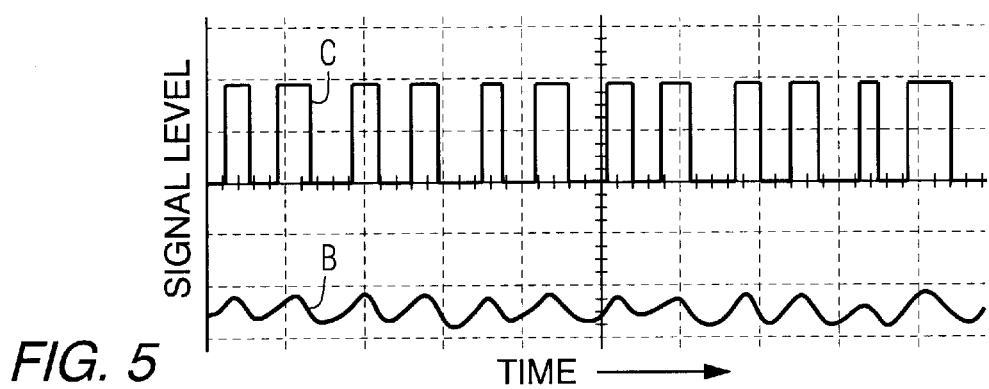

In FIG. 5, signal B is shown in comparison to the output C of the zero crossing detector 48. This is the fifth output signal 105 described above.

Figure 6:
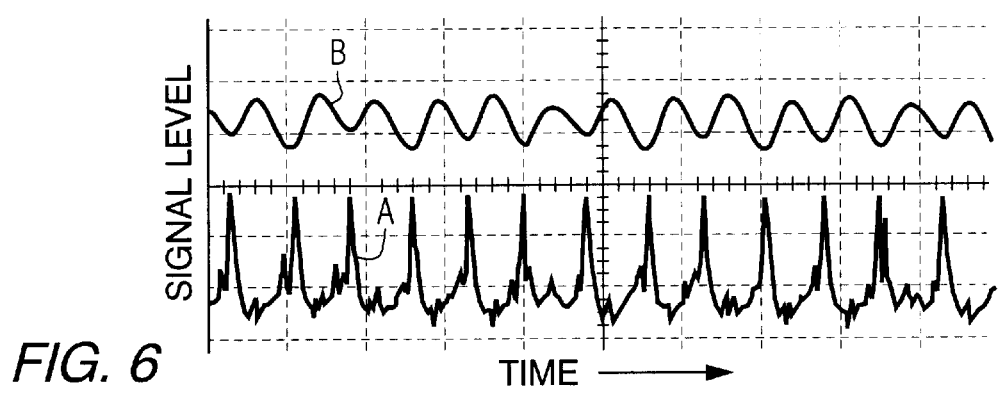
Figure 7:
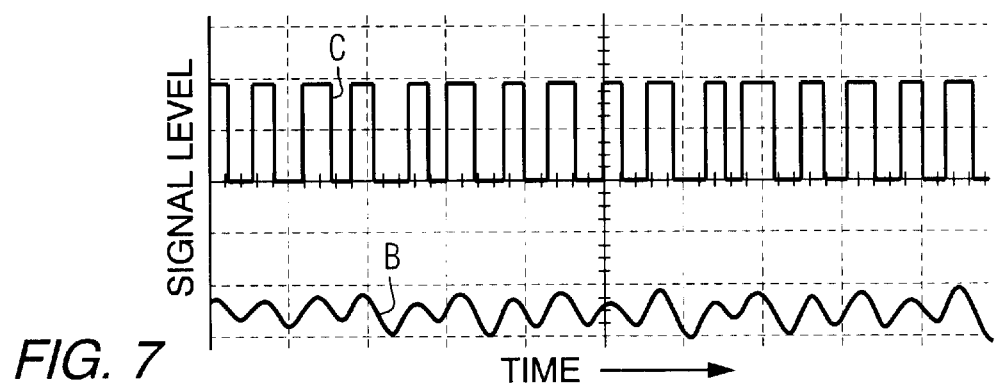

FIGS. 6 and 7 are generally similar to FIGS. 4 and 5, respectively, but illustrate the respective signals that are in existence when the trim tab actuator is causing the trim tab 20 to move when aided by the force of water. With reference to signals A in FIGS. 4 and 6, these show the output of the differential amplifier 40 in conditions where the trim tab is being moved against the force of the water (i.e. clockwise about pivot point 22 in FIG. 1) in FIG. 4 and aided by the force of water (i.e. counterclockwise about pivot point 22 in FIG. 1) in FIG. 6.

Figure 8:
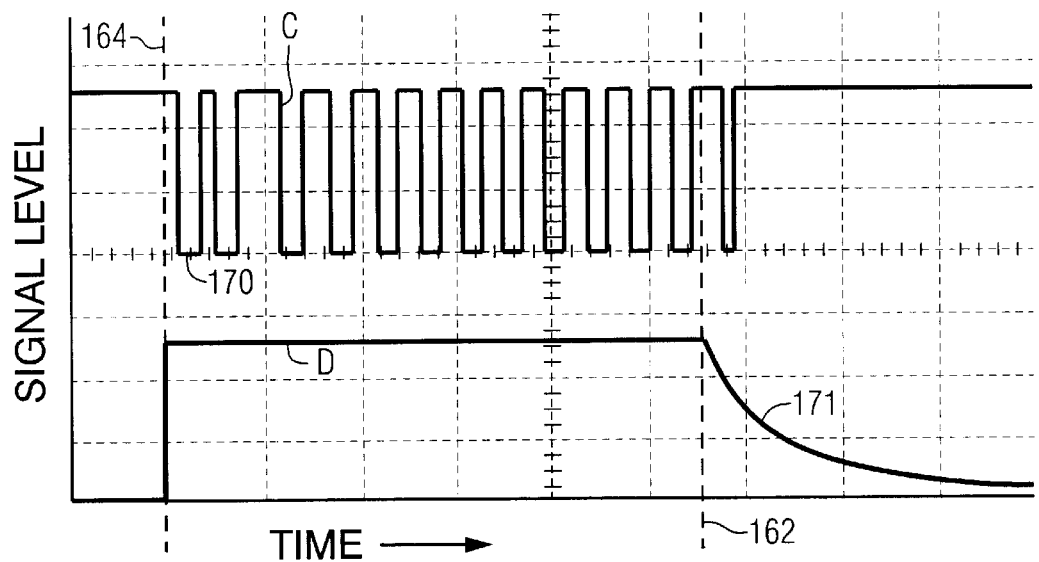
FIGS. 8 and 9 show various waveforms used to illustrate the differences in operation of the present invention for forward and backward movement of the trim tab.
Figure 9:
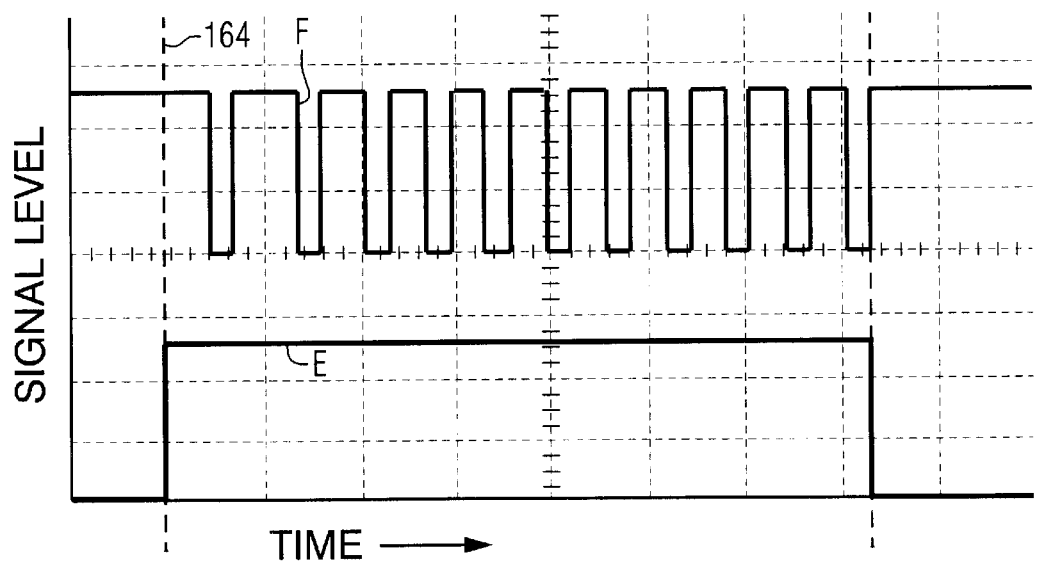

FIGS. 8 and 9 show the pulses transmitted by the up/down counter controller 72 to the signal output device 60 in comparison to the signal magnitude at point 134 in FIG. 3. In FIG. 8, the actuator 30 is being moved into or toward the motor 26 to cause the trim tab 20 to rotate counterclockwise about pivot point 22 and the system is aided by the force of water passing under the marine vessel 10. In FIG. 9, the actuator 30 is being extended away from the motor 26 to cause the trim tab to rotate clockwise about pivot point 22 and the trim tab is moving against the water force. In FIG. 8, the pulses C represent the signal provided to the signal output device 60 from the up/down counter controller 72. Signal D in FIG. 8 represents the output at point 134 in FIG. 3 which is provided by the dual optocoupler 80. When the trim tab 20 is moving counterclockwise in FIG. 1, it is aided by the movement of water under the marine vessel 10. This causes the slow decrease in the magnitude of signal D as illustrated at the right portion of FIG. 8. In FIG. 9, the output pulses F transmitted to the signal output device 60 are shown in comparison to signal E. FIG. 9 illustrates the signals in an application where the trim tab 20 is moving clockwise about pivot point 20 and against the force of water passing under the marine vessel 10.

When signal D decreases slowly in FIG. 8 in can be seen that one or more additional pulses of signal C occur after the motor is stopped as represented by 15 dashed line 162. This results from the cooperative association of capacitors C11 and C14 and resistors R18 and R23 which provide the slowed decrease in signal magnitude even though the signal from the dual optocoupler 80 indicates that the motor is turned off. In order to account the potential difference in pulse counts when the trim tab is being moved clockwise and counterclockwise, the signal 20 provided at diode D4 of the pulse conditioner subcircuit 70 works cooperatively with capacitor C12 and resistor R25 to generate additional pulses on startup of the motor which is represented by dashed line 164 in FIG. 8. This additional pulse, which is caused by the cooperative association of diodes D2 and D3, NOR device U7, and NAND gate U6, when diode D4 is not conducting, is identified by reference numeral 170 FIG. 8. If these additional pulses were not artificially provided by the pulse conditioner subcircuit 70, the series of pulses C in FIG. 8 would not begin immediately upon startup of the motor at line 164 because of the resistive action of the water passing under the marine vessel and aiding the intended movement of the trim tab 20. It can be seen that a similar initial pulse is not present in FIG. 9, at the start up of the motor, which is represented by line 164, as a result of the cooperative association of diode D4, capacitor C12, and resistor R25.

As described above, a preferred embodiment of the present invention comprises a sensing circuit connected in signal communication with a stator winding 29 of a motor 26. The sensing circuit can comprise a differential amplifier 40 and a low pass filter 44. A first output signal 101 is provided by the sensing circuit which is representative of an electrical characteristic of the motor 26. A direction determining circuit 80 is connected in electrical communication with the sensing circuit and is configured to provide a second signal 102 which is representative of a rotational direction of the rotor of the motor 26. A counter 50 is connected in electrical communication with the sensing circuit and configured to provide a third output signal 103 which is representative of a preselected number of magnitude changes of the first output signal 101. A signal output device 60 is connected in electrical communication with the counter 50 for providing a fourth output signal, on line 84, which is representative of the position of the trim tab 20 relative to the motor 26. The electrical characteristic of the motor 26 can be a voltage potential across the stator winding 29, as represented by signal A in FIGS. 4 and 6. The sensor circuit also comprises a zero crossing detector 48 which is configured to provide a fifth output signal 105. The signal output device 60 can be a digital potentiometer which is configured to receive a digital signal from an up/down counter controller 72 which is representative of a change in the rotational position of the rotor relative to a preselected position. The digital potentiometer provides a DC voltage signal, on line 84, which is representative of a stored digital count within the digital potentiometer which is representative of the cumulative change in the position of the rotor relative to a preselected position. The direction determining circuit 80 can comprise a dual optocoupler and the pulse conditioning subcircuit 70 can be connected in signal communication between the counter 50 and the signal output device 60 in order to properly condition the signals and account for discrepancies in pulse output from the motor 26 under differing conditions.

Although the present invention has been described in particular detail and illustrated to show a preferred embodiment, it should be understood that alternative embodiments are also within its scope.

I claim:

1. A trim tab position monitor, comprising:
a sensing circuit connected in signal communication with a stator of a motor, said motor having a rotor which is operatively connected to said trim tab for moving said trim tab relative to a marine vessel, said sensing circuit being configured to provide a first output signal which is representative of an electrical characteristic of said motor;
a direction determining circuit connected in electrical communication with said sensing circuit, said direction determining circuit being configured to provide a second output signal which is representative of a rotational direction of said rotor of said motor;
a counter connected in electrical communication with said sensing circuit, is said counter being configured to provide a third output signal which is representative of a preselected number of magnitude changes of said first output signal of said motor; and
a signal output device connected in electrical communication with said counter for providing a fourth output signal which is representative of the position of said trim tab relative to said motor.

2. The monitor of claim 1, wherein:
said electrical characteristic of said motor is a voltage potential across said stator of said motor, said voltage potential exhibiting magnitude fluctuations which are caused by the rotation of said rotor relative to said stator.

3. The monitor of claim 1, wherein:
said sensing circuit comprises a differential amplifier circuit connected in signal communication with said stator.

4. The monitor of claim 1, wherein:
said sensing circuit comprises a low pass filter for separating an AC component of said electrical characteristic from a DC component of said electrical characteristic.

5. The monitor of claim 1, wherein:
said sensing circuit comprises a zero crossing detector which is configured to provide a fifth output signal, said zero crossing detector being connected in signal communication with said counter.

6. The monitor of claim 1, wherein:
said signal output device is connected in signal communication with said counter and said signal output device is connected in signal communication with a boat position annunciator.

7. The monitor of claim 1, wherein:
said rotor is operatively attached to a threaded shaft, said threaded shaft being operatively connected to said trim tab, whereby rotation of said rotor causes said threaded shaft to rotate and rotation of said threaded shaft causes said trim tab to move relative to said stator of said motor.

8. The monitor of claim 1, wherein:
said signal output device is a digital potentiometer which is configured to receive a digital signal which is representative of a change in the rotational position of said rotor relative to a preselected position, said digital potentiometer providing a DC voltage signal which is representative of a stored digital count which is representative of the cumulative change in the position of said rotor relative to a preselected position of said rotor relative to said stator.

9. The monitor of claim 1, wherein:
said direction determining circuit comprises a dual optocoupler.

10. The monitor of claim 1, further comprising:
a pulse conditioning circuit connected in signal communication between said counter and said signal output device.

11. A trim tab position monitor, comprising:
a motor having a stator and a rotor, said rotor being operatively connected to is said trim tab to move said trim tab relative to said stator in response to rotation of said rotor relative to said stator;
a sensing circuit connected in electrical communication with said stator for sensing an electrical characteristic of said motor, said sensing circuit comprising a signal conditioning circuit, a zero crossing detector, and a direction determining circuit;
a counting circuit configured to provide a series of digital pulses which are responsive to said signal conditioning circuit and said zero crossing detector; and
a signal output circuit connected in signal communication with said counting circuit and said direction determining circuit and being configured to provide an analog output signal which is representative of a plurality of said digital pulses, said analog output signal being representative of the position of said trim tab relative to said stator.

12. The monitor of claim 11, further comprising:
an output pulse conditioning circuit connected between said counting circuit and said signal output circuit for controlling the timing and shape of said plurality of digital pulses.

13. The monitor of claim 11, wherein:
said motor is a DC motor.

14. The monitor of claim 11, wherein:
said signal conditioning circuit comprises a high pass filter, an amplifier, and a low pass filter.

15. The monitor of claim 11, wherein:
said direction determining circuit comprises a dual optocoupler.

16. The monitor of claim 11, wherein:
said signal output circuit comprises a digital potentiometer.

17. The monitor of claim 11, wherein:
said stator is rotatably attached to a transom of a marine vessel.

18. A trim tab position monitor, comprising:

a sensing circuit, connectable in electrical communication with a motor having a stator and a rotor, for sensing an electrical characteristic of said motor, said rotor being operatively connectable to said trim tab to move said trim tab relative to said stator in response to rotation of said rotor relative to said stator, said stator being rotatably attachable to a component which is fixedly attached to a transom of a marine vessel, said sensing circuit comprising a signal conditioning circuit, a zero crossing detector, and a direction determining circuit;

a counting circuit configured to provide a series of digital pulses which are responsive to said signal conditioning circuit and said zero crossing detector; and a signal output circuit connected in signal communication with said counting circuit and said direction determining circuit and being configured to provide an analog output signal which is representative of a plurality of said digital pulses, said analog output signal being representative of the position of said trim tab relative to said stator.

19. The monitor of claim 18, further comprising:

an output pulse conditioning circuit connected between said counting circuit and said signal output circuit for controlling the timing and shape of said plurality of digital pulses, said motor being a DC motor, said signal conditioning circuit comprising a high pass filter, an amplifier, and a low pass filter, said direction determining circuit comprising a dual optocoupler.

20. The monitor of claim 19, wherein:

said signal output circuit comprises a digital potentiometer.

* * * * *